Patented July 4, 1933

1,917,179

UNITED STATES PATENT OFFICE

CHARLES O. YOUNG AND GEORGE H. LAW, OF CHARLESTON, WEST VIRGINIA, ASSIGNORS TO CARBIDE & CARBON CHEMICALS CORPORATION, A CORPORATION OF NEW YORK

PREPARATION OF ALLYL ALCOHOL

No Drawing. Application filed December 12, 1930. Serial No. 502,904.

The invention is a process for making allyl alcohol ($CH_2=CHCH_2OH$) from propylene oxide

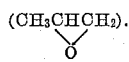

According to the invention the propylene oxide vapor is passed through a reaction chamber filled with a contact catalyst such as activated alumina heated to 200°–400° C. The atoms of the propylene oxide molecule are rearranged in two different ways, and in addition to unchanged propylene oxide, the resulting product contains both propionaldehyde and allyl alcohol. The conditions may be regulated so that 50% of the reacted propylene oxide is converted to allyl alcohol. The reaction products are separated by distillation, both the propionaldehyde and allyl alcohol being recovered.

It has been the general practice to prepare allyl alcohol by means of a reaction between glycerol and oxalic acid. This process does not produce allyl alcohol in satisfactory yields, and the process is difficult to operate, hence the advantages of this invention will be apparent.

It is well known that propylene oxide when passed over a contact catalyst such as alumina, heated to about 250° C., produces considerable quantities of propionaldehyde, but the formation of allyl alcohol in the process has not been reported. We have discovered that by careful regulation of temperatures and rates of flow through the zone of reaction, good yields of allyl alcohol may be produced in addition to propionaldehyde.

For the purposes of illustration a typical operation of our process will be described. An electrically heated tube is filled with a catalyst, such as granulated activated alumina. The propylene oxide is vaporized and, preferably mixed with nitrogen as an inert diluent, passed rapidly (i. e. the vapors are not allowed to stand in contact with the catalyst, but are in continuous motion thereover at a high rate of speed) through the catalyst chamber heated to 275° C. The exit gases are condensed and distilled. Approximately 50% of the propylene oxide is recovered unchanged. The balance is fractionated, and propionaldehyde, representing about 60% of the reacted propylene oxide, is removed. Water is added to the remainder, and a constant boiling mixture of allyl alcohol and water, containing 75% allyl alcohol is obtained.

The reaction as described is quite exothermic, and in order to control the temperature, it is desirable to pass some inert gas or vapor through the reaction tube admixed with the propylene oxide vapor. For this purpose nitrogen, water vapor, etc., may be employed. If the temperature is allowed to rise substantially beyond the specified limits, i. e. 200°–400° C., or if the propylene oxide vapor is permitted to remain too long in the reaction tube, further changes and decompositions may occur, resulting in the loss of valuable material.

It is preferred to use activated alumina as the catalyst, but other catalysts such as finely divided metals and oxides may be used. Thus, thoria, titania, etc., may be substituted for the activated alumina in the reaction chamber. We prefer to prepare the activated alumina by precipitating aluminum hydroxide from a hot concentrated solution of aluminum nitrate with sodium hydroxide; the aluminum hydroxide is filtered, dried, and made into pellets which are then washed for several hours in a stream of hot water and ignited. A very active porous catalyst is produced. A satisfactory catalyst may also be made by preparing aluminum ethoxide, by the reaction of ethyl alcohol with aluminum, evaporating to dryness, steaming and igniting.

The efficiencies and rates of production of allyl alcohol may vary considerably with the conditions chosen. We have found that by operating the process as described herein 50% of the reacted propylene oxide may be obtained as allyl alcohol, the balance being recovered as propionaldehyde.

We claim:

1. The process of making allyl alcohol which comprises rapidly and continuously passing propylene oxide vapor over a contact catalyst of the group consistsing of alumina, titania and thoria at a temperature between about 200° and about 400° C.

2. The process of making allyl alcohol which comprises rapidly and continuously passing propylene oxide vapor over a contact catalyst of the group consisting of alumina, titania and thoria at a temperature of about 200° to about 400° C., said propylene oxide vapor being admixed with an inert diluent whereby temperature control and prevention of long contact of the propylene oxide vapor with said catalyst is effected.

3. The process of making allyl alcohol which comprises passing propylene oxide vapor admixed with nitrogen at a high rate of speed over a contact catalyst composed of activated alumina heated to about 275° C., the passage of said vapors over said catalyst being continuous so that the vapors are not allowed to stand in contact therewith, and thereafter separating allyl alcohol from the other products of reaction.

In testimony whereof, we affix our signatures.

CHARLES O. YOUNG.
GEORGE H. LAW.